Aug. 24, 1954   W. G. HOELSCHER   2,687,065
MIRROR SYSTEM FOR TEMPLATE CONTROLLED MACHINE TOOLS
Filed May 9, 1950   4 Sheets-Sheet 1

INVENTOR.
William G. Hoelscher
BY
Wood, Arey, Herron & Evans
ATTORNEYS.

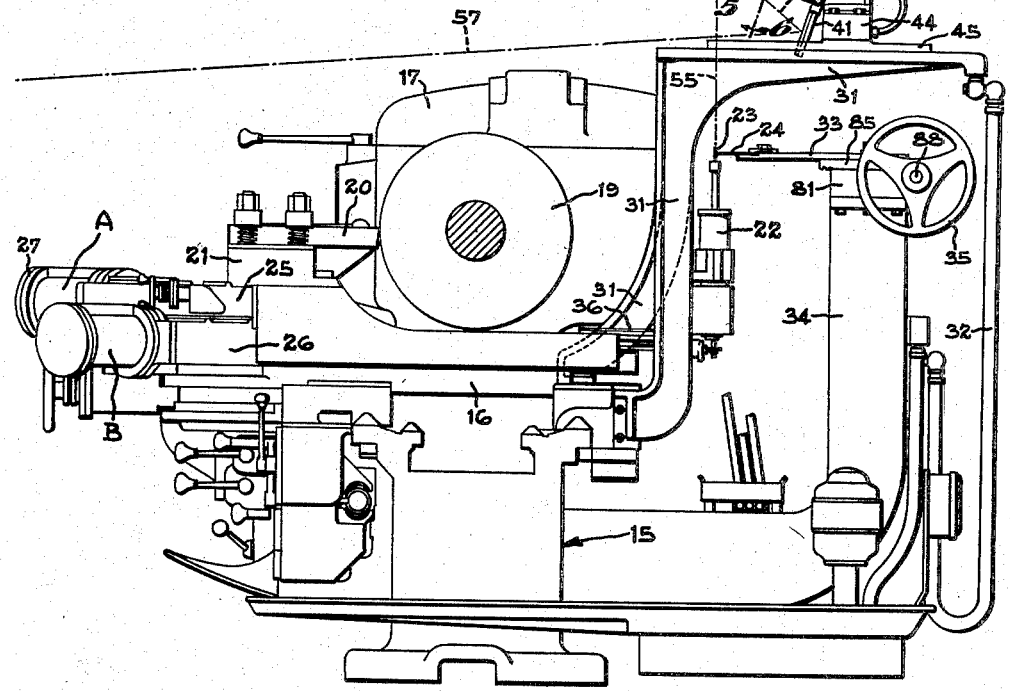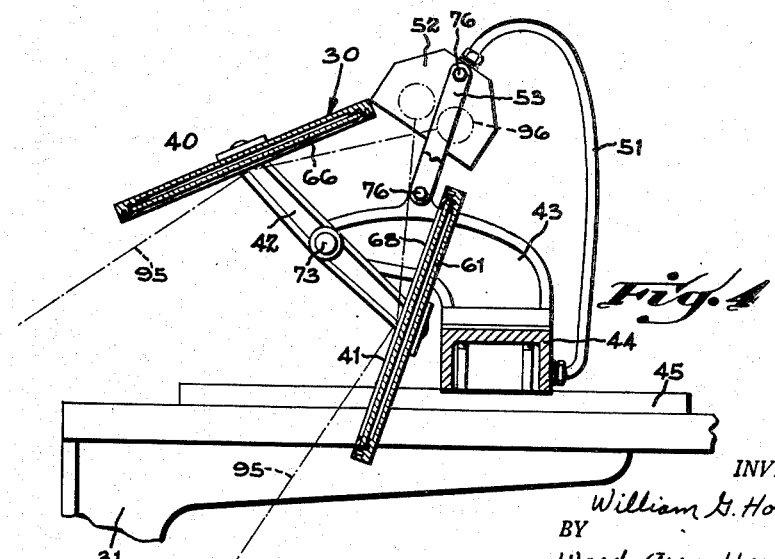

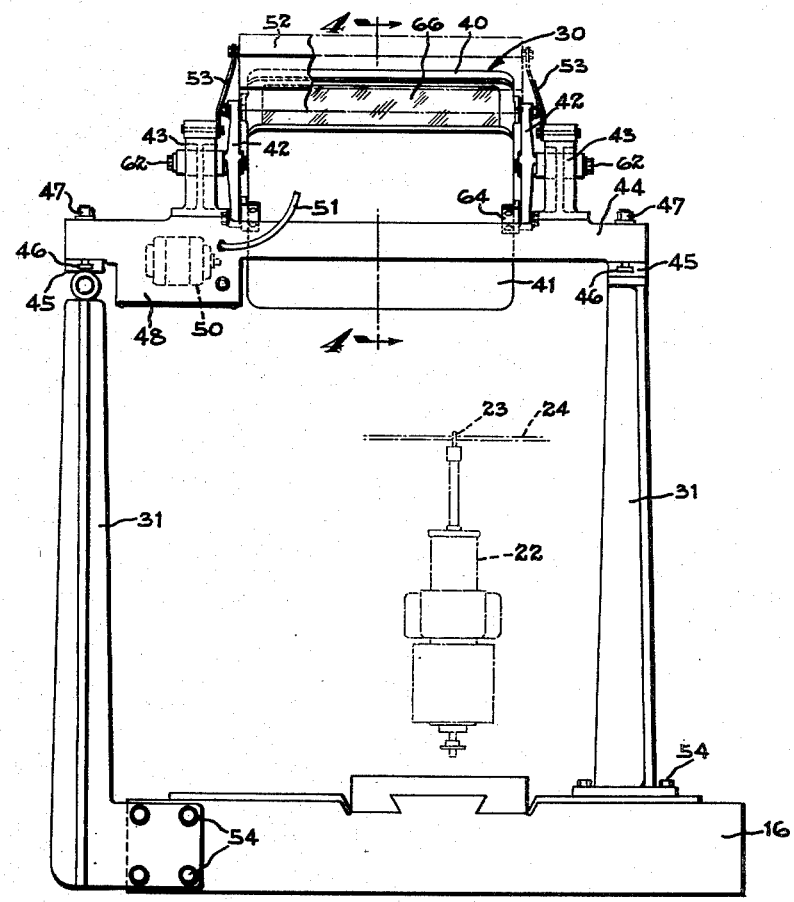
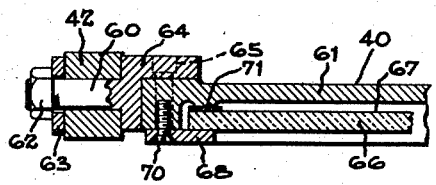
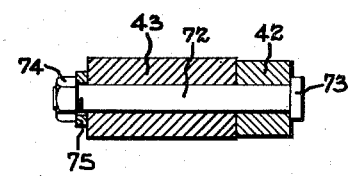

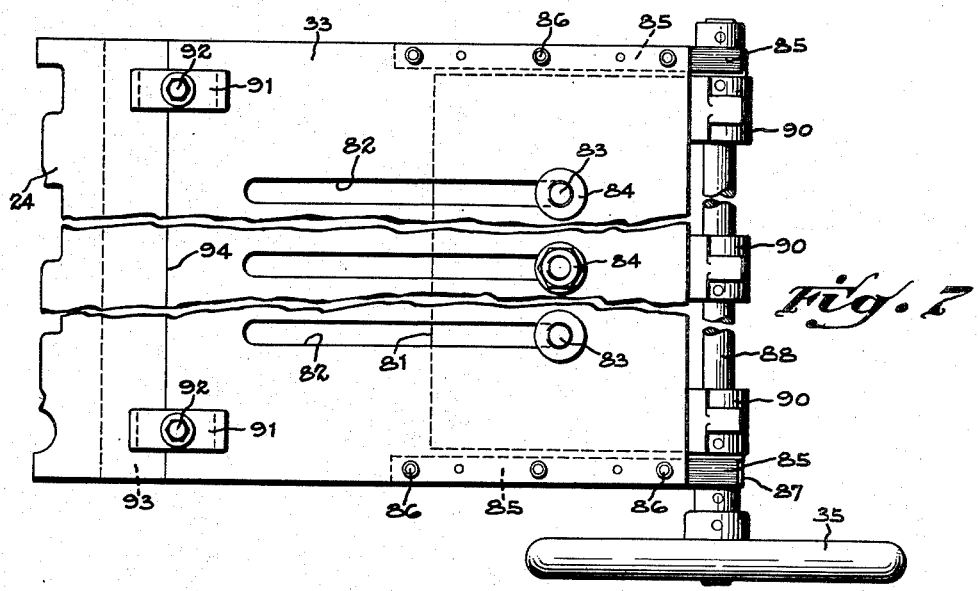

Patented Aug. 24, 1954

2,687,065

UNITED STATES PATENT OFFICE 2,687,065

MIRROR SYSTEM FOR TEMPLATE CONTROLLED MACHINE TOOLS

William G. Hoelscher, Cincinnati, Ohio, assignor to The American Tool Works Company, Cincinnati, Ohio, a corporation of Ohio Application May 9, 1950, Serial No. 161,009

3 Claims. (Cl. 88—74)

This invention relates to automatic duplicating lathes which utilize a stylus to trace the profile of a template and, by responsive movements of a hydraulically operated tool slide, reproduce accurately the template profile in a rotating workpiece. The invention resides more particularly in a mirror system arranged to reflect an erect image of the template and stylus, together with a mounting structure by which the positions of the template and mirror system are related to one another and to the lathe to compensate for various operating conditions.

Duplicating lathes of this class consist essentially of a translatable carriage having one or more hydraulically operated tool slides, and a stylus-operated tracer valve for controlling the feed of the tool slide by hydraulic pressure in response to changes in the template profile encountered by the stylus as it traces the profile. In most instances, the template consists of a flat plate mounted in fixed horizontal position at the rear of the lathe and the tracer valve is mounted on the rear of the tool slide with its stylus in position to trace the template profile as the carriage is translated along the bed; thus, the stylus and cutting tool follow exactly the template profile. Profiles having grooves, tapers, curves and undercuts can be duplicated from a template having the required configuration by such hydraulic operation. In order to generate such profiles, the carriage is translated along the bed at a predetermined rate of feed and the hydraulically operated tool slide is mounted upon the carriage at an angle to the axis of carriage travel with the tool slide and tracer valve arranged to move in a direction opposed to the longitudinal carriage feed. By correlating the rate of carriage feed to the rate of slide feed, the resultant tool and stylus movement coincides precisely with the profile of the template.

In a single slide machine, used for example in finishing a series of grooves or shoulders, the shoulders or sides of the grooves can be finished on one side only during carriage traverse in a given direction and the workpiece and template must be reversed end-for-end to finish the shoulders facing the opposite direction. A machine of this character is disclosed in the co-pending application of Manual Turchan and William G. Hoelscher for "Template Controlled Machine Tool," Serial No. 767,920, filed August 11, 1947, now Patent No. 2,603,117. The lathe disclosed in the present application follows generally the teachings of the co-pending application except that in the present instance the carriage is equipped with a double tool slide movable at angles oppositely related to the axis of carriage travel, and the hydraulic system is provided with a selector valve for placing the tool slides alternately in operation. By manual operation of the selector valve, the lathe operator is able to finish both sides of the grooves during a single pass by placing in operation the slide which moves angularly in a direction opposed to the direction of carriage travel. Thus, in finishing one side of a groove, one of the slides is fed inwardly as the carriage feeds away from the side being finished and after the tool and stylus reach the bottom of the groove, the other slide is placed in operation, causing the tool and stylus to move outwardly as the carriage moves toward the side being finished; therefore, in each movement the tool is fed in a direction opposite to the carriage feed.

Although the double slide machines can be applied to the turning and finishing of workpieces of a general nature, they are particularly useful in finishing deep grooved workpieces such as forming rolls which are used in the fabrication of structural steel I-beams, angle irons and the like. In turning a roll of this kind, the usual procedure is first to rough turn the grooves, utilizing for this purpose suitable roughing tools which are fed into the blank at the approximate location of the finished grooves, then to finish the grooves under tracer valve control, using an appropriate finishing tool. The finishing operation may be accomplished in a single pass, in which case, the operator shifts the selector valve in appropriate directions to allow the stylus and cutting tool to follow the template profile, as above noted. In certain critical finishing operations, for example, in finishing a groove having a circular cross section, it is necessary to shift the selector valve as the tool and stylus approach the exact center of the groove and, if the shift is made at the proper point, a smooth accurate finish which is free of lines is produced. If the shift is not made at the proper point, a surface irregularity results, making it necessary to reverse the carriage and repeat the operation.

In roughing in the blank, the operator of course uses the template and the related position of the stylus to locate the grooves and, in finishing, he relies upon the exact position of the stylus relative to the profile to shift the tool slide control valve. Since the template is located in flat position at the rear of the lathe opposite to the operator's position at the cutting tool, it is difficult, if not impossible, for the operator to perceive the exact position of the stylus relative to the template profile; therefore, the production of grooved rolls and similar work requiring accurate slide selection normally is difficult and tedious.

A primary object of the present invention, therefore, has been to solve this problem by the provision of a mirror system arranged to reflect to the operator a clear erect image of the template and the related position of the moving stylus with the stylus and cutting tool moving in the same direction such that the operator can, without difficulty or confusion, observe the cutting tool and select the slides in accordance with the movement of the stylus across the profile. A simple reflecting mirror would reflect a reversed image of the template and the movements of the stylus would appear to be opposite to the tool movements; thus, the template profile would not correspond to the work profile and the stylus movements would be opposite to the tool movements, causing a great deal of confusion. In the present structure, the image of the template which is reflected by the mirror system is substantially the same as if the operator were able to observe directly the template which occupies a horizontal position at the rear of the lathe bed behind the workpiece. The template thus is visible above the workpiece as if it were placed in a vertical plane with its profile edge down for direct comparison with the work profile. Since the image is corrected, the movement of the stylus is in the same direction as the cutting tool; and this combined with the true template image, enables the operator to control the slides accurately and without the possibility of confusion.

Essentially, the mirror system consists of a pair of angularly related plane reflecting mirrors, the first of which receives the light rays reflected from the template while the second receives the reflected rays of the first mirror and projects them toward the operator at the front of the lathe. The mirrors are mounted upon the carriage for movement with the carriage relative to the elongated template and the respective mirrors are adjustable with respect to one another so as to permit the angle of reflected light to be adapted to the convenience of the operator.

In setting up the lathe, the diameter of the workpiece is established by shifting the tracer valve relative to the tool slide; thus, the work diameter is determined by the spacing between the stylus and cutting tool while the depth of the grooves corresponds to the template independently of the diameter of the workpiece. The tracer valve necessarily has a limited range of adjustment and it is necessary in setting up the lathe to position the template transversely so that its profile is within the adjustment range of the tracer valve. Such a change in position will, of course, effect the mirror system unless the position of the mirrors are changed angularly with respect to one another or unless the position of the assembly is shifted bodily with respect to the template to reflect the template from its new position.

A further object of the invention, therefore, has been to provide a structure for adjustably mounting the template which is arranged to maintain the longitudinal alignment of the template; also to provide a structure arranged to permit the mirror system to be adjusted bodily to correspond to the position of the template and thereby to preserve the individual adjustment of the mirrors when a change in template position is made.

In order to align the template precisely upon its mounting structure, there is provided a movable adaptor plate having an abutment shoulder which forms a seat for the rear edge of the template. Parallel alignment of the adaptor plate is preserved by a pair of racks secured to its opposite ends meshing with respective pinions which are non-rotatably fixed to a shaft having an adjustment wheel secured upon it. Rotation of the shaft thus moves both ends of the adaptor plate an equal amount to maintain the plate and template in parallelism and clamping screws are provided which lock the plate permanently in adjusted position upon its support.

In order to provide adequate illumination, the mirror system is provided with a fluorescent lamp which projects its light rays upon the surface of the template to bring out the image of the template in sharp relief, particularly its profile. The lamp and mirrors are provided with individual adjustment means for changing their angular relationship and are mounted in common upon a support beam having its opposite ends adjustably supported by pedestals rising from the carriage. Thus, the entire assembly may be adjusted laterally upon the carriage relative to the template without disturbing the mirrors individually. The structure which supports the template rises from the bed, therefore, the mirror system, tracer valve and stylus move longitudinally relative to the template during carriage traverse and the portion of the elongated template which is active can be readily seen in the reflecting mirror by the operator.

An important feature of the improved mirror system resides in the novel relationship of the mirrors to one another and to the lamp whereby the mirrors function in a double capacity, first to reflect the template image and, secondly, to provide a shield for the lamp. For this purpose, the mirrors are spaced from one another at angles to reflect the template image in erected position with the lamp mounted along their upper edges in position to project the major portion of its light rays downwardly upon the template. The outside non-reflecting surfaces of the mirrors thus act as shields to prevent escape of light rays toward the operator and their reflecting surfaces, which face one another, deflect these rays downwardly toward the template and workpiece. In this manner, the light is concentrated upon the critical surfaces to provide brilliant illumination, while undesirable lamp glare, which interferes with visibility, is blocked effectively.

Various other features and advantages of the invention will be more fully apparent to those skilled in the art from the following description taken in conjunction with the drawings.

In the drawings:

Figure 2 is an end elevation with the tailstock removed illustrating the lathe assembly, the relationship of the mirror system to the template for projecting to the operator an erected image of the template and stylus, the direction of the light rays being indicated by broken lines.

Figure 3 is a rear elevation of the lathe carriage removed from the lathe showing the mirror arrangement and its mounting structure with respect to the carriage.

Figure 4 is an enlarged sectional view taken on line 4—4, Figure 3, detailing the reflecting mirrors and the structure for mounting the mirrors in adjusted position relative to one another and to the lamp.

Figure 5 is an enlarged sectional view taken on line 5—5, Figure 2, detailing the adjustable trunnion bearing for the mirror mounting plates.

Figure 6 is a sectional view taken on line 6—6, Figure 2, detailing the adjustable pivot bearing for the support arms which carries the mirrors in spaced relationship with one another.

Figure 7 is a fragmentary top plan view taken on an enlarged scale detailing the adjustable structure which supports the template beneath the mirror system in operating relationship with the tracer stylus.

Figure 8 is an end view projected from Figure 7 further illustrating the template mounting structure.

Figure 9 is a diagrammatic view illustrating the movements of the stylus and cutting tool during the finishing of a semi-circular groove and showing the point at which the hydraulic selector valve is shifted by the operator to place in operation the respective hydraulic cylinders in accordance with the direction of template contour.

Figure 10 is a diagrammatic view illustrating the template and stylus image as viewed in the mirror system by the operator at the front of the lathe.

Figure 1:
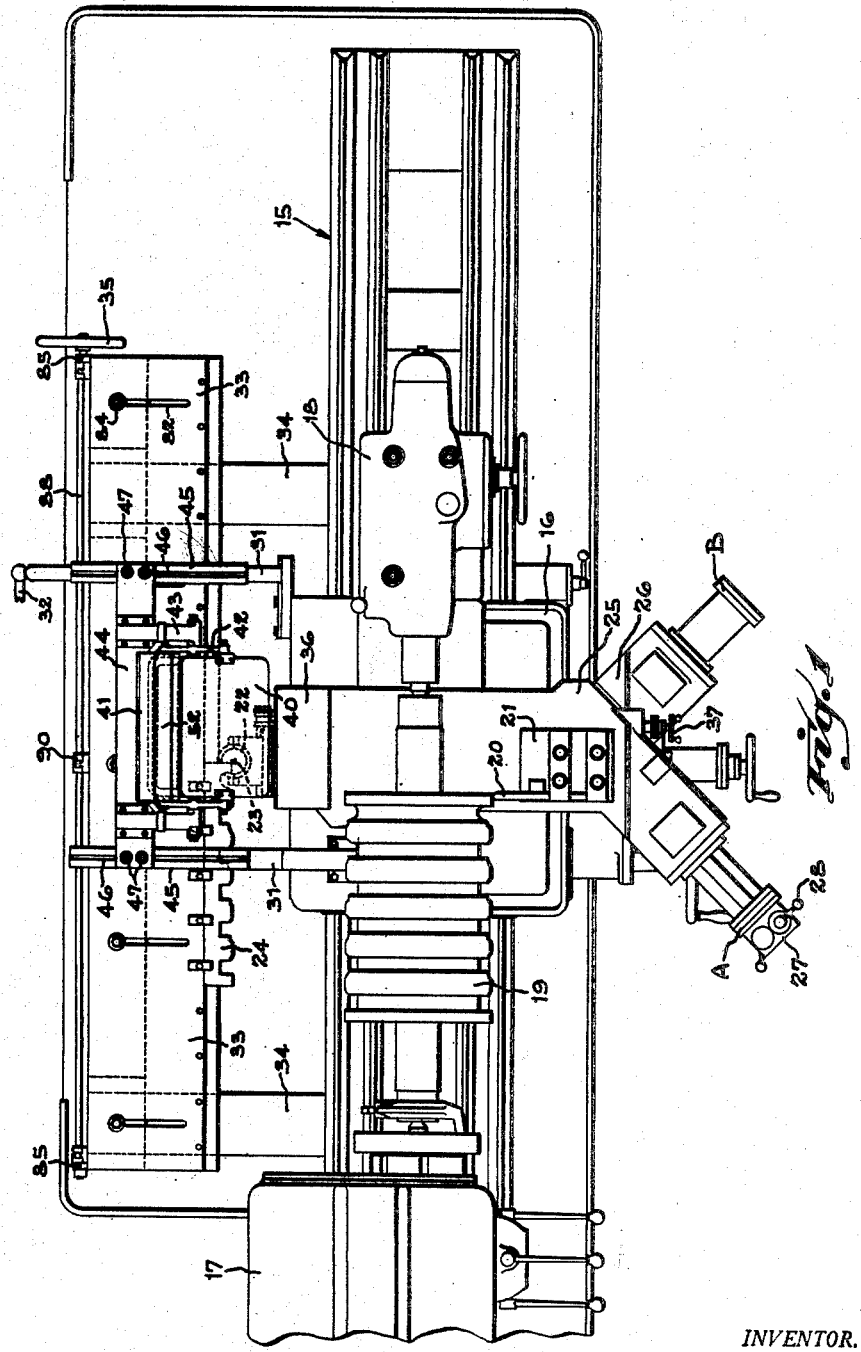
Figure 1 is a top plan view illustrating the general arrangement of a hydraulic duplicating lathe equipped with the present mirror system and related adjustable template support.

Described generally with reference to Figures 1 and 2, the hydraulic roll turning lathe, which is selected as a preferred embodiment of the mirror system, consists generally of a bed 15 upon which is mounted a translatable carriage 16 which is fed longitudinally relative to the headstock 17 and tailstock 18. The workpiece 19, as a typical example, constitutes a forming roll which is mounted between the headstock and tailstock for rotation relative to a cutting tool 20 mounted upon a tool holder 21. As disclosed, the workpiece has been rough turned and is in condition for finishing by automatic operation of the tracer valve 22 as controlled by the stylus 23 as it traces the template profile 24.

In general, the duplicating apparatus constitutes a pair of hydraulic cylinder assemblies indicated respectively at A and B which are mounted upon the carriage and interconnected hydraulically with the tracer valve 22. The cylinder A actuates an upper slide 25 which carries the tool holder 21 and the cylinder B is related at right angles to cylinder A and operates a lower slide 26. The upper slide 25 is mounted upon the lower slide 26 in such manner that operation of the lower slide by cylinder B causes the upper slide to move unitarily with and along the axis of the lower, while operation of the upper slide 25 by cylinder A causes slide 25 and the cutting tool to move relative and at right angles to the lower slide.

The respective cylinders A and B are selectively placed in operation by a hydraulic valve 27 mounted upon cylinder A and having a manually operated selector lever 28. In operation, the carriage is translated longitudinally along the bed at a fixed rate and the cylinders are placed in operation alternately in accordance with the direction of carriage of transmission. In other words, the tool and stylus are moved in unison by the respective slides at an angle opposed to the longitudinal carriage feed such that the resultant of the longitudinal and angular movements constitutes a line of movement which may be related at right angles to the axis of the work or which may follow any other angular or curved template contour. Thus, when the carriage travels to the left toward the headstock, as viewed in Figure 1, the cylinder assembly A is placed in operation so that outward movement of the tool opposite to the direction of carriage feed generates a straight shoulder to the right side of the first groove. Upon reaching the bottom of the groove, the cylinder B is placed in operation, generating a straight shoulder by feeding the tool outwardly on the left side of the groove, again in a direction opposed to the carriage travel.

In finishing certain critical contours, the finishing cut may be started at the center of the rough turned groove and the curve generated by feeding the tool outwardly in opposite directions from the center of the groove, as illustrated diagrammatically in Figure 9. This method of operation causes the stylus to move toward the template profile at both sides of the groove instead of moving toward one side and away from the opposite side. In operation it has been determined that the spring loaded stylus has a tendency to "hunt" when it encounters a diverging profile and the slight hesitation so produced is transmitted to the cutting tool, causing a slight irregularity in surface finish. In finishing less critical profiles, such as those having flat bottomed grooves as shown in Figure 1, the carriage may be fed continuously in the same direction by making the slide reversal at intermediate points during the pass across the tops and bottoms of the grooves. In this mode of operation, the first round bottomed groove may be finished by working from its center as above outlined, then the carriage may be fed toward the left in a single pass across the balance of the work. In this case, cylinder A is placed in operation to form the right hand side of the first flat bottomed groove by feeding the tool in. During the feed across the bottom of this groove, cylinder B is placed in operation by actuating lever 28, causing cylinder B to form the straight shoulder on the left hand side of the groove by feeding the tool out. During passage over the roll diameter to the next groove, cylinder A again is placed in operation to form the right side of the next groove and so on across the roll. This procedure may be followed in feeding the carriage in either direction by placing in operation the slide which has its axis running toward the face to be machined, whether it be a shoulder, groove side or any other curved or angular surface contour. It will be understood that in either direction of carriage feed, the slides feed in an opposite direction; consequently, one of the slides will finish its shoulders by feeding the tool inwardly and the other will feed outwardly, in both cases the tool feed being opposed to the direction of carriage feed.

It will be apparent that in all modes of operation, it is necessary that the operator observe clearly the relative position of the stylus with respect to the template profile from his position at the carriage control levers, in which position he may also observe the position of the cutting tool with respect to the groove being finished. The improved mirror structure in conjunction with the template support provides a clear erected view of the template and stylus even though a direct view may be blocked completely by the work. Since the stylus and cutting tool move in unison, the direction of stylus movement is reflected in the same direction as actual stylus and tool movement, thus preventing confusion and mistakes by the operator in manipulating the carriage control levers.

As disclosed most clearly in Figures 2 and 3, the mirror system which is indicated generally at 30, is adjustably mounted upon the vertical mirror standards 31—31, one of which supports the coolant conduit 32. The lower ends of the standards are mounted upon the carriage so that the mirror assembly moves in unison with the carriage and tracer valve relative to the stationary template 24. The template is mounted for transverse adjustment upon an adaptor plate 33 slidably mounted for movement transversely to the axis of the work upon the vertical template standards 34—34 which rise from the bed. A hand wheel 35, which is located at one end of the adaptor plate, may be rotated to position the profile of the template with respect to the tracer valve stylus.

In order to control the diameter of the work, the tracer valve 22 is mounted upon a slide block 36 which may be adjusted transversely with respect to the carriage by means of a micrometer adjustment wheel 37 (Figure 1). In other words, the work diameter is determined by the distance between the stylus and cutting edge of the tool with the stylus resting against the template profile as shown. Rotation of tracer adjustment wheel 37 in a direction to adjust the block 36 and tracer valve toward the template profile opens the tracer valve and transmits hydraulic fluid pressure to an end of one of the cylinders A or B to cause the tool slide to feed outwardly and adjustment of the valve away from the profile feeds the tool inwardly. Changing the distance between the template and the cutting tool thus changes the over-all diameter of the work but does not change the profile as determined by the template. When the machine is set up for the correct diameter, successive workpieces may be duplicated at a production rate by hydraulic operation of the cylinders under tracer control to reproduce the profile of the template in the workpieces.

The adjustment range of the tracer valve necessarily is limited by the effective operating range of the slide block upon which it is mounted. Therefore, in order to bring the profile of the template within the adjustment range of the tracer valve, the template may, if necessary, be adjusted by means of hand wheel 35 laterally relative to the stylus.

Since the mirror system and tracer valve are both mounted upon the carriage, the two parts move in unison with respect to the template which is supported in fixed position relative to the lathe bed by the adjustable adaptor plate. The template is approximately the same length as the working span of the lathe bed so that a template equal in length to the maximum length of work may be mounted in operating position. As shown, the template is mounted in a horizontal plane and the mirror system is arranged to traverse the template and reflect an erected image of it with the working portion of its profile at the lower edge of the image corresponding to the work profile, as viewed by the operator at the cutting tool; therefore, the stylus position corresponds to that of the cutting tool and its movements appear in the same direction. The image projected by the mirror system is disclosed diagrammatically in Figure 10 with its advancement relative to the template indicated in broken lines. The corresponding positions of the stylus and cutting tool during progress of a tracing operation are indicated diagrammatically in Figure 9.

As illustrated most clearly in Figure 4, the mirror system constitutes a pair of reflecting mirrors 40 and 41 maintained in spaced relationship and at predetermined angles with respect to one another by the spaced mounting arms 42—42 which are supported intermediate their length by the overhanging brackets 43—43 mounted upon the cross channel 44. Channel 44 is adjustably mounted at opposite ends upon the overhanging rails 45—45 of the standards 31, each rail having a T-slot 46 (Figure 3) traversed by T-bolts 47 having their heads engaged in the slot and passing through the ends of channel 44. As viewed in Figure 3, the channel includes a housing 48 enclosing a transformer 50 which is connected by way of cable 51 to a fluorescent lamp 52 mounted upon a pair of arms 53—53 having their lower ends secured to the overhanging bracket 43. The lower ends of the standards 31—31 which support the channel 44 are secured by means of bolts 54 to the carriage 16 and the power cable for conducting electrical energy to the transformer is carried by the overhanging portion of one of the standards in the same manner as the conduit 32.

The fluorescent lamp 52 is mounted in a position to illuminate clearly the template 24 particularly its profile and the position of the stylus 23 relative to the profile. As shown diagrammatically in Figure 2, the light rays are reflected as indicated by the broken line 55 from the template to the reflecting surface of the upper mirror 40, then downwardly at an angle indicated by line 56 to the surface of the lower reflecting mirror 41. From mirror 41, the image is reflected toward the operator as indicated by the broken line 57. It will be noted that the angulation of the mirrors is such that the angles of incidence and reflection of the indicated ray, which of necessity are equal to one another, are provided by mounting the mirrors adjustably upon the support arms 42—42. By properly adjusting the mirrors with respect to one another, the angle of the light rays indicated by line 57 may be changed to suit the convenience of the operator, the mirrors preferably being adjusted to project the image of the template profile approximately at the eye level of the operator.

For this purpose, each mirror is adjustably mounted by means of the trunnion bearings 60 secured to the opposite ends of the mirror mounting plate 61 and passing through the ends of the arms 42—42, as detailed in Figure 5. The outer ends of the bearings include a nut 62 engaging a washer 63 interposed between the nut and arm. The opposite side of the arm is engaged against a lug 64 forming a part of the bearing, the lug being secured to the mounting plate by screws 65. The mirror 66 in the present instance constitutes a glass panel having its rear surface silvered, as at 67, the mirror being clamped within the frame by a marginal frame 68 engaged by screws 70 and clamping the mirror against rubber backing strips 71.

By loosening the nuts 62—62 at opposite ends of the mirror frame, the mounting plate may be adjusted angularly with respect to the arms 42. The structure disclosed in Figure 5 is duplicated for both mirrors 40 and 41 so that they are capable of convenient angular adjustment with respect to one another and may be clamped permanently in adjusted position by tightening the nuts 62.

The arms 42 also are mounted for angular adjustment with respect to the standards 43 in the manner detailed in Figure 6. As shown, a screw 72 extends through the ends of bracket 43, each screw having a head 73 engaging the surface of arm 42 and passing through the bracket with a nut 74 threaded upon its opposite end. A washer 75 is interposed between the nut 74 and bracket to lock the arms in adjusted position. The arms 53 which support the lamp 52 permit angular adjustment of the lamp, the arms being frictionally engaged with respect to the bracket 43 and lamp 52 by screws 76.

The entire assembly including the lamp and mirrors may be adjusted transversely by loosening the nuts 47—47 thereby permitting the channel 44 to be adjusted transversely upon the standards 31—31 with respect to the template. As above noted, the template may be adjusted transversely by operation of handwheel 35 to place its profile within the operating range of the tracer valve stylus and, if necessary, the mirror and lamp assembly may be correspondingly adjusted to bring the mirrors in reflecting position above the template profile to reflect the image to the operator. It is to be noted that the individual adjustment of the mirrors need not be disturbed when the mirror assembly is adjusted transversely with respect to the template unless it is desired to change the angle defined by the broken line 57 to adapt the mirror system to the operator.

The template mounting structure, as detailed most clearly in Figures 7 and 8, consists generally of the adaptor plate 33 slidably mounted upon a cross rail 81 which is supported at opposite ends upon the spaced standard 34—34 rising from the lathe bed. The plate 33 includes a series of elongated cross slots 82 traversed by studs 83 having clamping nuts 84 threaded thereon and adapted to clamp the adaptor plate securely in adjusted position upon the cross member 81. The adaptor plate is adjusted transversely and in parallelism with the longitudinal axis of the lathe bed by means of racks 85—85 secured by screws 86 to the underside of the adaptor plate, having teeth meshing with the teeth of a pair of rack pinions 87—87 secured upon a cross shaft 88. The adjustment wheel 35 is secured to one end of shaft 88 and the shaft is journalled in bearing blocks 90 secured along the rear edge of the cross member 81. The meshing teeth of the racks and gears are accurately meshed to eliminate back mesh and thereby to maintain the adaptor plate precisely in alignment with the longitudinal axis of the lathe bed.

The template 24 is mounted upon the edge of the adaptor plate by means of clamping dogs 91 having their opposite ends in clamping engagement respectively upon the surface of the adaptor plate and template. The dogs are held in clamping engagement by means of screws 92 passing through the dogs into screwthreaded engagement with the adaptor plate. In order to align the template precisely with the adaptor plate, a recess 93 is milled into the edge of the plate to provide a template locating shoulder 94, the recess being in depth equal to the thickness of the template to dispose the upper surface of the template in flush relationship with the adaptor plate. In forming the template, the rearward edge may be finished and used as a reference line in developing the template profile and the width of the template is not critical by virtue of the hand wheel adjustment.

In turning a roll having a series of relatively deep grooves of the type disclosed, the grooves are located approximately and cut to their approximate depth and width by a series of roughing operations, followed by a finish cut under template control. In rough turning, a roughing or slotting tool is mounted upon the tool holder 21 and into the roll blank at the approximate location of the grooves, utilizing the template as a guide in locating the grooves and in limiting their depth. After the first rough turning operation, a second rough forming tool may be mounted in the tool holder and utilized in widening the grooves to their approximate width, leaving sufficient material at the bottom and sides of the grooves for the final finishing cut under hydraulic tracer operation. The finishing operation is performed by a finishing tool having a cutting edge capable of forming the sides of the grooves or shoulders and also the necessary corners or filets, depending upon the character of the work. The finishing operation may constitute either a continuous pass across the work or, in some instances, each groove may be finished individually by working in opposite directions from its center, as previously outlined. In a continuous pass, the carriage may be positioned as shown in Figure 1 and the tracer valve adjusted by means of the handwheel 37 to establish the basic diameter of the work by positioning the cutting edge of the tool with respect to the stylus which is in contact with the template. The longitudinal feed is then coupled to feed the carriage toward the headstock with the hydraulic system in an operating condition to actuate the cylinders A and B in accordance with stylus movements. The operator is able to observe in the mirror system the exact relationship of the template and stylus for guidance in operating the selector valve. It will be observed in Figure 10 that the erected image of the template and stylus reflected by the mirror 41 corresponds identically with the profile of the workpiece; furthermore, the direction of stylus movement corresponds to the direction of tool movement, thus simplifying slide selection and providing a direct and reliable guide for the operation of the selector valve.

In forming a groove which is curved in cross section, as illustrated in Figure 9, it has been found that the finishing operation is performed with greater efficiency if the groove is generated from its center outwardly in opposite directions. This is due to an increase in sensitivity and precision when the stylus is moved by the template instead of under spring operation. In other words, in forming the radius during inward tool movement, the stylus has a tendency to "hunt" the diverging template profile, causing minute irregularities in the workpiece. On the other hand, by moving outwardly from the center of the groove, as indicated, the stylus is under positive engagement against the template profile, with the result that a more accurate work profile is reproduced. In this mode of operation, the operator feeds the tool at the center of the groove and, since the rough groove does not indicate the exact center of its contour, the reflected image of the template provides an accurate guide for this purpose. Thus, the tool may be fed exactly on center and the carriage may be fed in opposite directions from center and the valve 28 shifted accurately in accordance with the stylus position, as indicated in the diagram.

As shown in Figure 4, the mirrors 40 and 41 are related to one another at opposite sides of the lamp 52 in angular positions to reflect the template image and, at the same time, to form a shield to prevent lamp glare. The lamp consists of a hood or reflector having angularly related top walls and side walls enclosing the fluorescent tubes 96 and having end walls for supporting the opposite ends of the tubes. The lower portion or bottom of the hood is open and the side walls are generally coextensive with the upper edges of the mirrors. The lower edges of the lamp hood are approximately contiguous with the upper edges of the mirrors and the reflecting surfaces diverge downwardly and outwardly from the lamp hood. As indicated by the broken lines 95, a portion of the light rays from the fluorescent tubes 96, which otherwise would be projected toward the front of the lathe, are deflected by the mirrors downwardly toward the template and workpiece. In this manner, the light is concentrated upon the working portion of the template, producing a clear reflected image of the template and stylus.

Having described my invention, I claim:

1. An optical system for a duplicating lathe having a bed, a translatable carriage, a template mounted in a horizontal plane at the rear of the bed, and a stylus adapted to move relative to the template, said optical system adapted to illuminate the stylus and a portion of the template and project an erected image thereof to an observer at the front of the bed, said optical system comprising, a support structure mounted upon the carriage and rising upwardly therefrom, a pair of reflecting mirrors mounted upon the upper portion of the support structure and spaced apart transversely from one another, said mirrors disposed above the template and stylus and extending longitudinally in parallelism with one another and with the bed, said mirrors each having plane reflecting surfaces facing one another and diverging downwardly relative to one another, one of said reflecting surfaces being disposed at an angle to receive an image of the template and stylus, the other reflecting surface being disposed at an angle to the first to receive said image and reflect the image in erected position toward the observer at front of the lathe bed, a lamp mounted upon said support structure and disposed above the upper edges of said spaced mirrors, said lamp including a source of light and having an opening which projects light rays in a generally downward direction between said spaced mirrors, the downwardly diverging reflecting surfaces of said mirrors being disposed at an angle to said source of light to reflect light rays from the source of light upon the portion of the template which is reflected as an erected image toward the front of the bed.

2. An optical system for a duplicating lathe having a bed, a translatable carriage, a template mounted in a horizontal plane at the rear of the bed, and a stylus adapted to move relative to the template, said optical system adapted to illuminate the stylus and a portion of the template and project an erected image thereof to an observer at the front of the bed, said optical system comprising, a support structure mounted upon the carriage and rising upwardly therefrom, a pair of reflecting mirrors mounted upon the upper portion of the support structure and spaced apart transversely from one another, said mirrors disposed above the template and stylus and extending longitudinally in parallelism with one another and with the bed, said mirrors having plane reflecting surfaces generally facing one another and diverging downwardly relative to one another, one of said reflecting surfaces being disposed at an angle to receive an image of the template and stylus, the other reflecting surface being disposed at an angle to the first to receive said image and reflect the same in erected position toward the observer at front of the lathe bed, a lamp mounted upon said support structure and disposed above the upper edges of said spaced mirrors, the upper edges of said mirrors being spaced apart transversely to provide an opening therebetween below said lamp, said lamp having a hood and a light source therein, said hood having an open bottom which projects light rays in a generally downward direction between the spaced mirrors, the hood having side edges along said open bottom which are generally contiguous with the upper edges of said mirrors, the downwardly diverging reflecting surfaces of said mirrors being disposed at an angle to the light source to reflect light rays from said tubes upon the portion of the template which is reflected as an erected image toward the front of the bed.

3. An optical system for a duplicating lathe having a bed, a translatable carriage, a template mounted in a horizontal plane at the rear of the bed, and a stylus adapted to move relative to the template, said optical system adapted to illuminate the stylus and a portion of the template and project an erected image thereof to an observer at the front of the bed, said optical system comprising, a support structure mounted upon the carriage and rising upwardly therefrom, a pair of reflecting mirrors mounted upon the upper portion of the support structure and spaced apart transversely from one another, said mirrors disposed above the template and stylus and extending longitudinally in parallelism with one another and with the bed, said mirrors having plane reflecting surfaces generally facing one another and diverging downwardly relative to one another, one of said reflecting surfaces being disposed at an angle to receive an image of the template and stylus, the other reflecting surface being disposed at an angle to the first to receive said image and reflect the same in erected position toward the observer at front of the lathe bed, a lamp mounted upon said support structure and disposed above the upper edges of said spaced mirrors, the upper edges of said mirrors being spaced apart transversely to provide an opening therebetween below said lamp, said lamp having an elongate hood providing side and end walls, said hood being generally coextensive with said mirrors, the lower edges of said side walls being generally contiguous with the upper edges of said mirrors, and a plurality of lighting tubes mounted within said hood and coextensive therewith, the downwardly diverging reflecting surfaces of said mirrors being disposed at an angle to the lighting tubes to reflect light rays from said tubes upon the portion of the template which is reflected as an erected image toward the front of the bed.

References Cited in the file of this patent

UNITED STATES PATENTS

| Number | Name | Date |
| --- | --- | --- |
| 862,833 | May | Aug. 6, 1907 |
| 1,110,318 | Field et al. | Sept. 15, 1914 |
| 2,130,710 | Alexander | Sept. 20, 1938 |
| 2,492,798 | Harley | Dec. 27, 1949 |